US008564231B2

(12) United States Patent
Dornhof

(10) Patent No.: US 8,564,231 B2
(45) Date of Patent: Oct. 22, 2013

(54) METHOD FOR SENSORLESS OPERATION OF AN ECM, AND MOTOR FOR CARRYING OUT

(75) Inventor: Konstantin Dornhof, Immendingen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 13/296,227

(22) Filed: Nov. 14, 2011

(65) Prior Publication Data

US 2012/0126730 A1 May 24, 2012

Related U.S. Application Data

(62) Division of application No. 11/127,856, filed on May 11, 2005, now Pat. No. 8,058,825.

(30) Foreign Application Priority Data

May 12, 2004 (DE) .......................... 10 2004 024 639
Feb. 14, 2005 (DE) .......................... 10 2005 007 905

(51) Int. Cl.
    *H02P 1/04* (2006.01)
(52) U.S. Cl.
    USPC .................................. 318/400.17; 318/400.21
(58) Field of Classification Search
    USPC ............. 318/400.17, 400.21, 400.32, 400.35, 318/632
    See application file for complete search history.

(56) References Cited

U.S. PATENT DOCUMENTS

| 4,162,435 | A  |   | 7/1979  | Wright .................... 318/400.4 |
| 4,250,544 | A  |   | 2/1981  | Alley ........................ 700/69 |
| 4,477,757 | A  | * | 10/1984 | Palombo et al. ............. 318/696 |
| 4,695,782 | A  | * | 9/1987  | Jatnieks .................... 318/748 |
| 4,857,814 | A  | * | 8/1989  | Duncan ..................... 318/281 |
| 4,950,960 | A  |   | 8/1990  | Krefta et al. ............. 318/400.2 |
| 4,983,894 | A  | * | 1/1991  | Oku et al. ................ 318/400.1 |
| 5,247,231 | A  | * | 9/1993  | Glucina ..................... 318/380 |
| 5,343,127 | A  | * | 8/1994  | Maiocchi ................ 318/400.11 |
| 5,513,058 | A  |   | 4/1996  | Hollenbeck ................... 361/36 |
| 5,545,961 | A  | * | 8/1996  | Peter et al. ................ 318/647 |
| 5,592,058 | A  |   | 1/1997  | Archer et al. ........... 318/400.09 |
| 5,646,491 | A  | * | 7/1997  | Erdman et al. .......... 318/400.35 |
| 5,859,512 | A  | * | 1/1999  | Buthker ................... 318/400.04 |
| 6,078,152 | A  | * | 6/2000  | Dieterle et al. .............. 318/264 |
| 6,396,226 | B2 | * | 5/2002  | Schmider et al. ........ 318/400.26 |
| 6,986,688 | B1 |   | 1/2006  | Jansen ......................... 440/1 |
| 7,429,840 | B2 | * | 9/2008  | Pollock et al. ............. 318/254.1 |
| 2005/0030002 | A1 | * | 2/2005 | Shao et al. ................. 324/76.77 |
| 2006/0284581 | A1 | * | 12/2006 | Mullin et al. ................ 318/362 |

* cited by examiner

*Primary Examiner* — Rina Duda
(74) *Attorney, Agent, or Firm* — Milton Oliver, Esq.; Oliver Intellectual Property

(57) ABSTRACT

An electronically commutated motor (ECM) often employs a Hall sensor for reliable operation. Even when a Hall sensor is omitted from a motor having a plurality of stator winding phases (24, 26) and a permanent-magnet rotor (22), one can reliably detect direction of rotation of the rotor by the steps of: (a) differentiating a voltage profile obtained by sampling either (1) induced voltage in a presently currentless phase winding or (2) voltage drop at a transistor, through which current is flowing to a presently energized phase winding, and (b) using such a differentiated signal (du__24"/dt, du__26"/dt) to control current flow in an associated phase winding. In this manner, one obtains reliable commutation, even if the motor is spatially separated from its commutation electronics.

7 Claims, 22 Drawing Sheets

METHOD FOR SENSORLESS OPERATION OF AN ECM, AND MOTOR FOR CARRYING OUT

CROSS-REFERENCE

This application claims priority from my German applications DE 10 2004 024 639.4 filed 12 May 2004 and DE 10 2005 007 905.9 filed 14 Feb. 2005, the entire contents of which are hereby incorporated by reference.

FIELD OF THE INVENTION

The invention relates to a method for sensorless operation of an electronically commutated motor (ECM), and a motor for carrying out such a method. Such a motor can have a single phase, or preferably a plurality of phases.

BACKGROUND

A preferred application of the invention is in "double-phase" motors. This may be explained as follows: because handy abbreviations are always desirable in engineering, and a differentiation in terms of "two-pulse" and "two-phase" is too complex for normal commerce, the generic term "double-phase motors" is usually used for such motors, regardless of whether such a motor has one or two phases.

Because, for example, a two-pulse motor receives two stator current pulses (which in some circumstances can be very short, e.g. only 10° el., and can also be subdivided into even shorter pulses by pulse width modulation) in its stator for each rotor revolution of 360° el., in motors of this design, a gap in the electromagnetically generated torque occurs between the two stator current pulses, and this gap is bridged by an auxiliary torque of arbitrary nature. This can be a mechanically generated auxiliary torque, but in the majority of cases it is a so-called "reluctance torque," which results from the interaction of a permanent-magnet rotor with the iron masses of the stator.

For this purpose, the iron masses of the stator must be distributed inhomogeneously with respect to the stator's circumference; there are infinite possibilities for this. When the permanent-magnet rotor of a (currentless) motor of this kind is then driven at uniform speed, it induces an alternating voltage in the stator winding, i.e. the motor then works as an alternating-current generator. The induced alternating voltage deviates from the sinusoidal shape, and its shape additionally depends on the rotation direction. These factors must be taken into account in the design of such motors.

SUMMARY OF THE INVENTION

It is an object of the invention to provide a new electronically commutated motor in which direction of rotation of the rotor is detected without using a Hall sensor.

According to the present invention, this object is achieved by measuring or sampling at least two points of either the profile of the induced voltage, if the phase winding is within a currentless period, or the profile of the voltage drop at the transistor through which current is flowing to a currently energized phase, and processing these data to detect the rotation direction of the rotor. The result is that a value for the instantaneous rotation direction of the motor is obtained directly from the profile of the voltages induced in the motor, and the motor can be stopped and restarted if it is running the "wrong" way.

A particularly advantageous refinement of the invention is to make an additional, temporally separated, measurement of operating voltage, and to use this information to compensate for any noise which may have influenced the first two measurements. This allows the influence of noise voltages to be largely eliminated. This is important because a usual analog filter circuit would result in phase shifts, which would make reliable sensing of the rotation direction impossible. The temporal separation, while not ideal from a theoretical standpoint, conserves scarce computational resources.

Another manner of achieving the stated object is to differentiate a motor voltage signal, and to use the differentiated signal to control current flow in an associated phase winding of the stator. This makes possible simple generation of control signals in order to control the currents in the stator winding of such a motor. It has been found that it is particularly favorable, for this purpose, to differentiate the voltage induced in at least one phase, and to control the commutation of the motor using this differentiated signal. This results in very reliable commutation, even when there is a physical distance between such a motor and its electronics. This can be the case when the motor must operate in a very hot or very aggressive environment, and the motor's electronics must therefore be arranged physically separately from it.

BRIEF FIGURE DESCRIPTION

Further details and advantageous refinements of the invention are evident from the exemplary embodiments, in no way to be understood as a limitation of the invention, that are described below and shown in the drawings.

DETAILED DESCRIPTION

Figure 1:
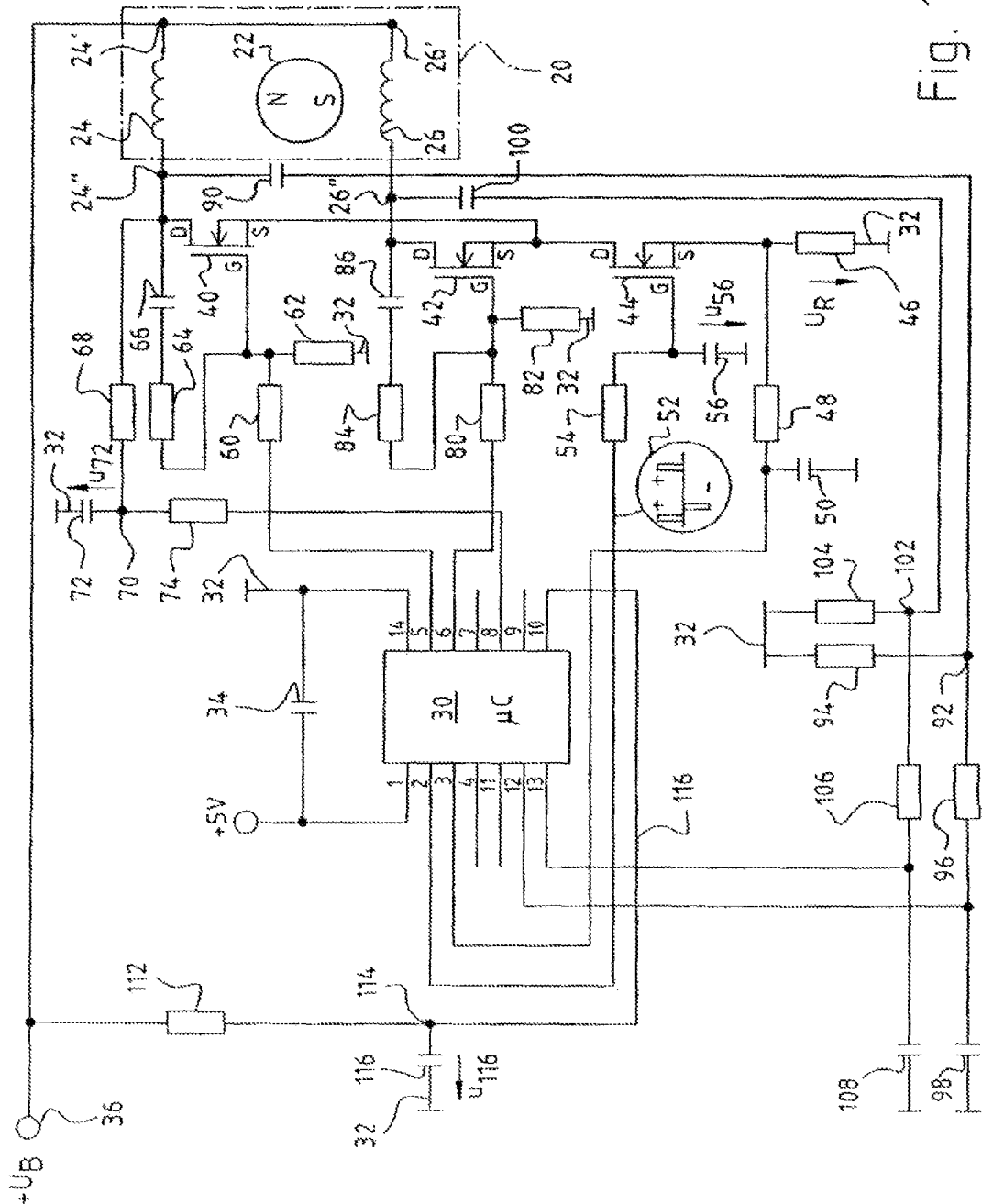
FIG. 1 shows a preferred circuit for a low-output electronically commutated motor (ECM), here a double-phase motor.
Figure 14:
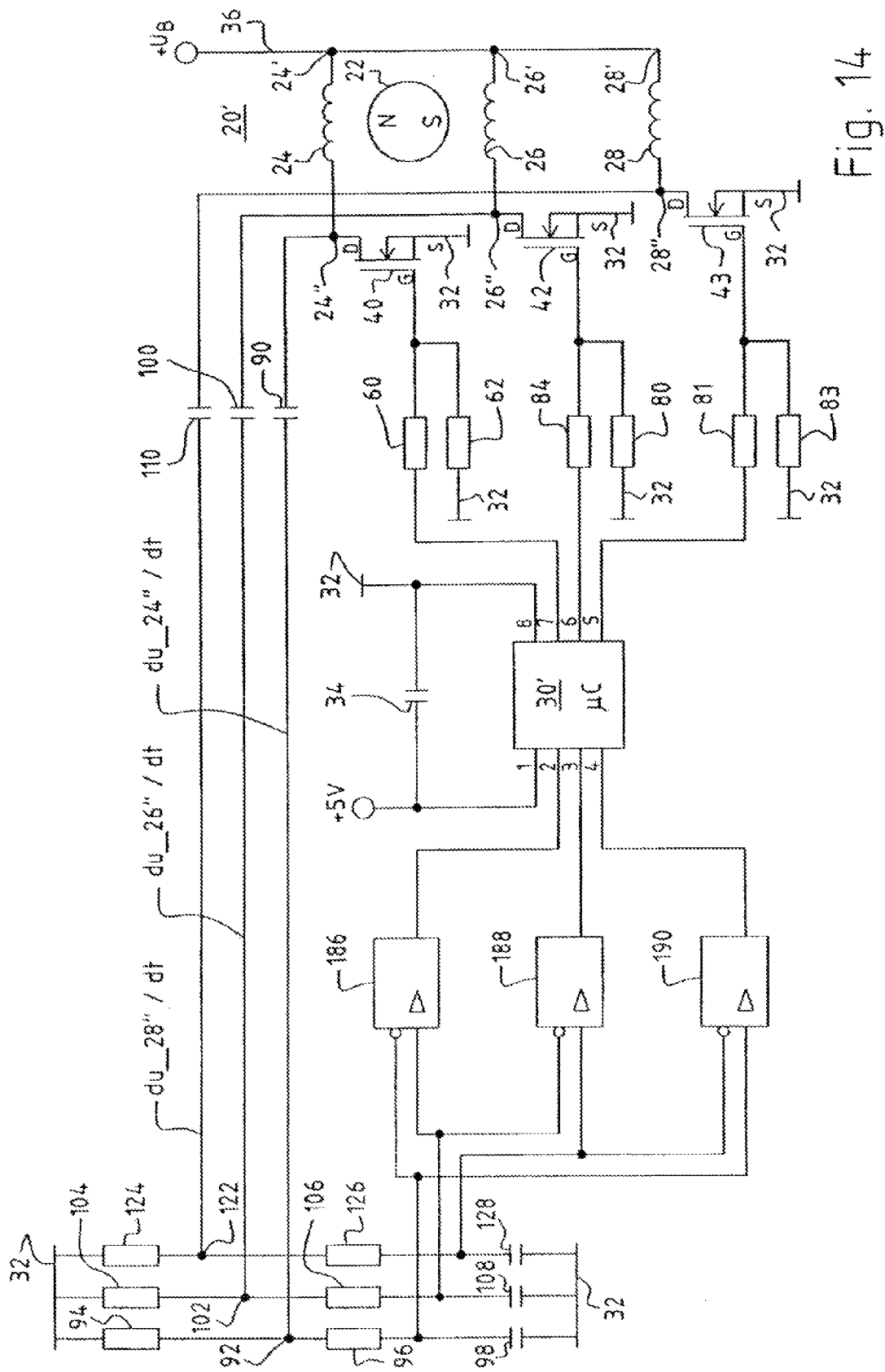
FIG. 14 is a circuit diagram which shows utilization of the invention in the context of a three-phase motor.

FIG. 1 shows a circuit for operating a so-called two-pulse electronically commutated motor 20 that has a permanent-magnet rotor 22 and a stator winding that is depicted here having two phases 24, 26, which are usually magnetically coupled to one another via the iron of the stator lamination stack (not depicted). A motor of this kind is called "two-pulse" because for each rotor rotation of 360° el., two stator current pulses flow in stator winding 24, 26. In many cases the stator winding can also have only one phase, and then a current pulse flows in it in the one direction during one rotation through 180° el., and a current pulse flows in the opposite direction during the subsequent rotation through 180° el. There are many designs for these motors, which are produced in enormous quantities. A typical example is shown in the Müller patents, DE 23 46 380-C2 and corresponding U.S. Pat. No. 4,119,895. Such motors are often implemented as so-called "claw pole" motors, the claw poles then being implemented in such a way that they generate a reluctance torque dependent on rotational position. FIG. 14 below depicts a three-pulse motor in which three stator current pulses flow for each rotor rotation through 360° el.

Most motors of this kind use a Hall sensor to sense the rotor position. When it becomes necessary to operate such motors at high temperatures, however, or when the elements for controlling the motor must be physically separated from it, the rotor position must be sensed according to the so-called sensorless principle, i.e. without a Hall sensor. FIG. 1 refers to such a circuit. Rotor 22 is depicted with two poles, but could also have different numbers of poles. In a two-pole rotor, one complete revolution corresponds to a rotation through 360° electrical (el.)., i.e. in this case:

$$360° \text{ mech.} = 360° \text{ el.} \qquad (1)$$

For a four-pole rotor:

$$360° \text{ mech.} = 720° \text{ el.}$$

These relationships are familiar to those of ordinary skill in the art of electrical engineering.

Motor 20 is controlled by a microcontroller (μC) 30 whose terminals are labeled 1 through 14. These refer to a μC of the PIC16F676 type, details of which are available from the website WWW.MICROCHIP.COM, operated by Microchip Technology Inc. of Chandler, Ariz., USA. Terminal 1 is connected to a regulated voltage of +5 V, and terminal 14 to ground 32. A capacitor 34 is connected between terminals 1 and 14.

Motor 20 is supplied with power by an operating voltage $U_B$. The positive terminal is labeled 36, and first terminals 24', 26' of phases 24, 26 are connected to it. Present between terminal 36 and ground 32 is, for example, a potential difference $U_B = 13$ V, i.e. the voltage of a typical vehicle battery (not shown).

An n-channel MOSFET (Metal Oxide Semiconductor Field Effect Transistor) 40 serves to control the current in phase 24, and an n-channel MOSFET 42 to control phase 26. For that purpose, terminal 24" of phase 24 is connected to drain terminal D of transistor 40, and terminal 26" of phase 26 to terminal D of transistor 42. The source terminals S of the two transistors are connected to one another and to drain D of an n-channel MOSFET 44 which serves to generate a constant total current in phases 24, 26. Source S of transistor 44 is connected to ground 32 via a resistor 46 serving for current measurement. The voltage $u_R$ at resistor 46 is delivered via an RC filter element 48, 50 to input 3 of μC 30. The μC furnishes, at its output 2, a control signal 52, for example a PWM (Pulse Width Modulation) signal, corresponding to the magnitude of $u_R$. Inexpensive μCs do not usually have a hardware PWM control system, however, and a PWM signal would therefore need to be generated by a program, i.e. by software. This would consume most of the resources of such an inexpensive μC, and thereby lock up the μC.

In practice, therefore, capacitor 56 is charged only once through resistor 54 to a voltage $u_{56}$, which voltage controls the working point of transistor 44 so as to yield the desired constant current in motor 20; and that constant current is consequently adjustable via the program of μC 30.

After this initial charging, output 2 of μC 30 is switched over to its high-resistance state. When capacitor 56 then discharges, the voltage $u_R$, at measuring resistor 82 changes. In this case the voltage $u_{56}$ at capacitor 56 is merely "refreshed," i.e. slightly increased or slightly reduced.

An increase is effected by the fact that during one processor cycle (e.g. for 1 microsecond), output 2 is set to HIGH so that the charge of capacitor 56 is slightly increased via resistor 54; or output 2 is set to LOW during one processor cycle so that the charge of capacitor 56 is slightly reduced (via resistor 54). Only small currents therefore flow to or from the capacitor, and this has the advantage that μC 30 cannot be damaged by large currents.

Transistors 40, 42 are each driven by control transistor 44 in the source region in such a way that the current through phases 24, 26 is substantially constant at least during commutation. Transistors 40, 42 are operated, for that purpose, as so-called pinch-off current sources. When transistor 40 is made conductive, for example, control transistor 44 acts as a resistor with respect to ground 32. The magnitude of the current through phase 24, 26, and therefore the rotation speed of motor 20, can therefore conveniently be set and modified by way of the voltage $u_{56}$.

The result of control transistor 44 is that the drain-source voltage $U_{DS}$ in transistors 40 and 42 is modified, and the magnitude of the current through phases 24 and 26 is therefore also influenced. Another possible result of this is that transistors 40, 42 operate in the pinch-off range. All types of field-effect transistors exhibit a pinch-off range of this kind.

When control transistor 44 is driven in such a way that it exhibits a high resistance and therefore low conductivity, the potential at source S of the respectively conductive output-stage transistor 40, 42 then rises. As a result, less current flows through that transistor and it transitions into the pinch-off range.

When control transistor 48 is driven in such a way that it has a low resistance and therefore high conductivity, the potential present at source S of the respectively conductive transistor 40 or 42 is therefore low. The high gate-source voltage associated therewith results in a correspondingly high current intensity in phases 24, 26.

In contrast to an ordinary commutation operation, the current in motor 20 is thus kept substantially constant, with the result that motor 20 runs very quietly.

Transistor 40 is controlled by output 5 of μC 30, and transistor 42 is controlled by output 6. For that purpose, output 5 is connected via a resistor 60 to gate G of transistor 40, which is connected via a resistor 62 to ground 32 and via the series circuit of a resistor 64 and a capacitor 66 to drain D. The latter is connected via a resistor 68 to a node 70, which is connected via a capacitor 72 to ground 32 and via a resistor 74 to terminal 8 of µC 30. (Terminals 4, 7, 9, and 11 of µC 30 are not connected.)

During operation, a voltage $u_{72}$ that is used to determine the rotation direction of rotor 22 occurs at capacitor 72. This will be described below.

Output 6 is connected via a resistor 80 to gate G of transistor 42, which is connected via a resistor 82 to ground 32 and via the series circuit of a resistor 84 and a capacitor 86 to drain D.

Second terminal 24" of phase 24 is connected via a capacitor 90 to a node 92, which is connected via a resistor 94 to ground 32 and via a resistor 96 to input 12 of µC 30, to which a filter capacitor 98 is also connected.

Second terminal 26" of phase 26 is connected via a capacitor 100 to a node 102, which is connected via a resistor 104 to ground 32 and via a resistor 106 to input 13 of µC 30, to which a filter capacitor 108 is also connected.

Elements 90 through 108 serve to control the point in time during a rotor rotation at which the current switches from phase 24 to phase 26 or vice versa. With increasing rotation speed, the moment at which commutation from one phase to the other occurs can be shifted toward an earlier or a later point in time; borrowing from the terminology of a gasoline engine, this is usually referred to as "ignition advance," even though of course nothing is being "ignited" in an electric motor 20.

Connected to terminal 36 via a resistor 112 is a node 114 that is connected via a capacitor 116 to ground 32. A voltage u_116 dependent on the voltage at terminal 36 occurs during operation at capacitor 116, and this voltage is delivered via a line 118 to input 10 of µC 30 and serves to eliminate, by computation, noise voltages that are contained in voltage $u_{72}$. This will be described below.

Preferred Values of Components in FIG. 1 (for $U_B$=13 v)

| | |
|---|---|
| Transistors 40, 42, 44 | ILRL3410 |
| C72, 116 | 2 nF |
| C50, 66, 86, 98, 108 | 1 nF |
| C34, 56 | 100 nF |
| R62, 68, 82, 94, 96, 104, 106, 112 | 100 kilohm |
| R48, 54, 60, 80 | 10 kilohm |
| R74 | 0 ohm |
| R46 | 1.5 ohm |
| R64, 84 | 1 kilohm |

Ascertaining the Rotation Direction

The rotation direction is ascertained by sensing and analyzing the voltage induced by permanent-magnet rotor 22 in an unenergized phase of motor 20 during operation, or by sensing the voltage drop occurring at a transistor through which current flows to the energized phase. This is possible because, in a motor of the kind described initially, these voltages have different shapes depending on the rotation direction. It is possible to derive therefrom the desired information regarding the rotation direction of the motor relative to the reluctance torque.

Figure 2:
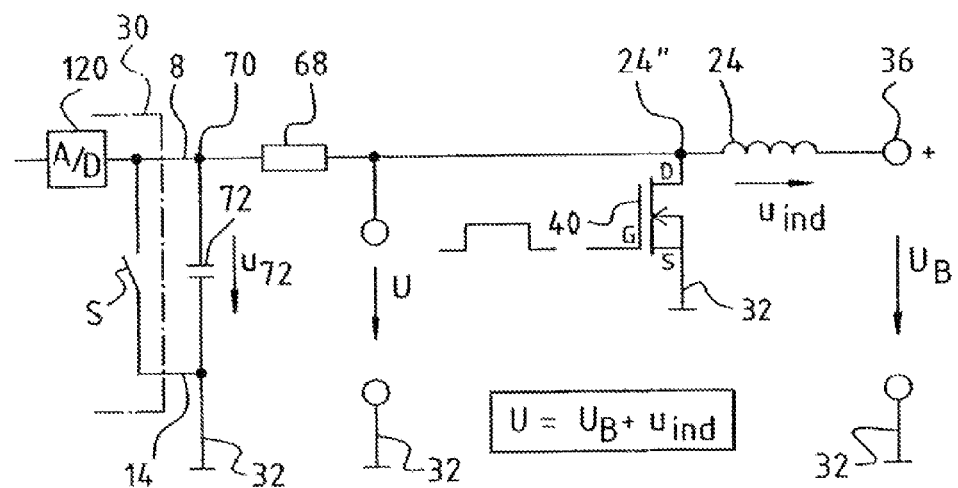
FIG. 2 is a schematic depiction to explain FIG. 1.

FIG. 2 shows a portion of FIG. 1, namely the essential elements of the measurement circuit for sensing the rotation direction.

The potential at point 24" of phase 24 is measured when transistor 40 is nonconductive, i.e. when transistor 42 is carrying current. In this case operating voltage $U_B$ is present at point 36, and added to this is the induced voltage $u_{ind}$ in currentless phase 24, so the potential U at point 24" is $$U = U_B + u_{ind} \quad (2).$$

This potential is delivered through resistor 68 to capacitor 72.

Located in parallel with capacitor 72 is a switch S in µC 30; this switch S is closed most of the time—symbolized by "SC" (=switch closed) thus keeping capacitor 72 discharged so that during this time, voltage $u_{72}$ has a value of zero.

When a measurement M is to be performed, switch S is opened by the program of µC 30 so that the voltage $u_{72}$ at capacitor 72 rises to a value corresponding approximately to the instantaneous voltage U. This voltage at capacitor 72 is converted in A/D converter 120 into a digital value and temporarily stored.

If the interval between two commutations is designated Tp (see FIG. 5), this happens a first time, for example after a time Tp/4 and, at this point in time, a first measurement M1 is performed and a first value u_72.1 is stored.

After a predetermined time period, e.g. after 0.5-0.6 Tp, a second measurement M2 is then performed, and the second value u_72.2 measured at that point is also stored.

A potential difference L is then calculated, i.e.:

$$\Delta = u\_72.2 - u\_72.1 \quad (3),$$

and the sign of the difference Δ is determined.

Figure 3:
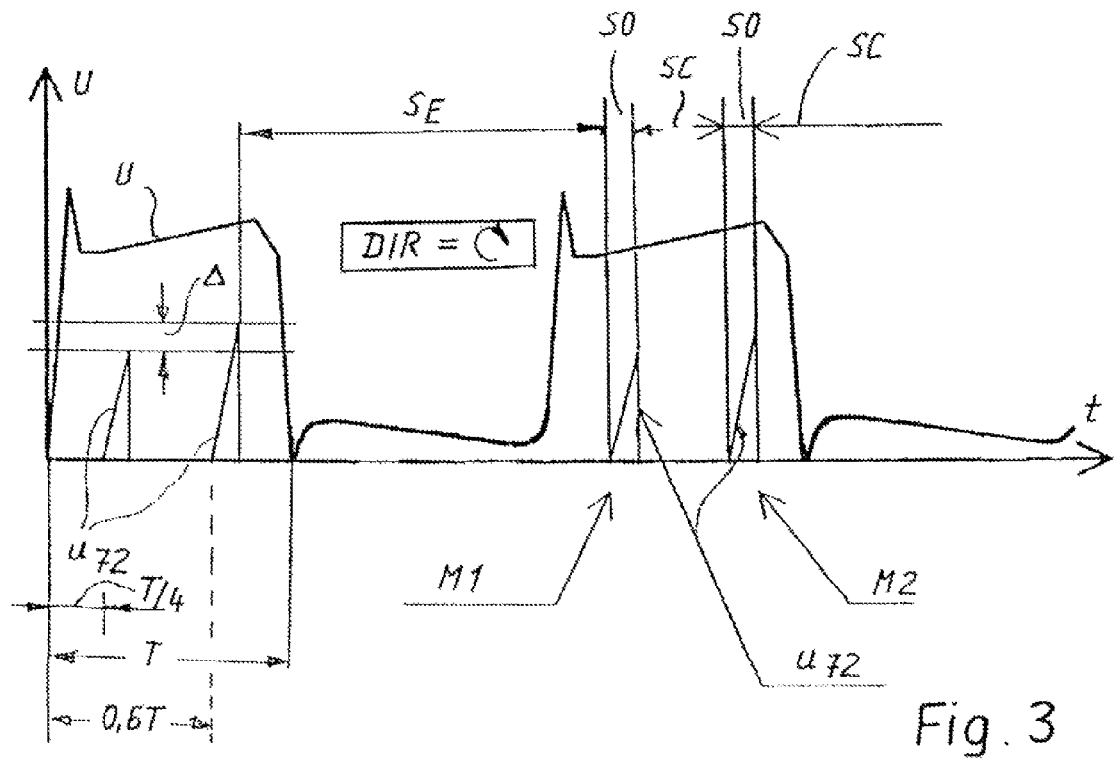
FIG. 3 is a diagram to explain FIGS. 1 and 2 for one of the two rotation directions.
Figure 4:
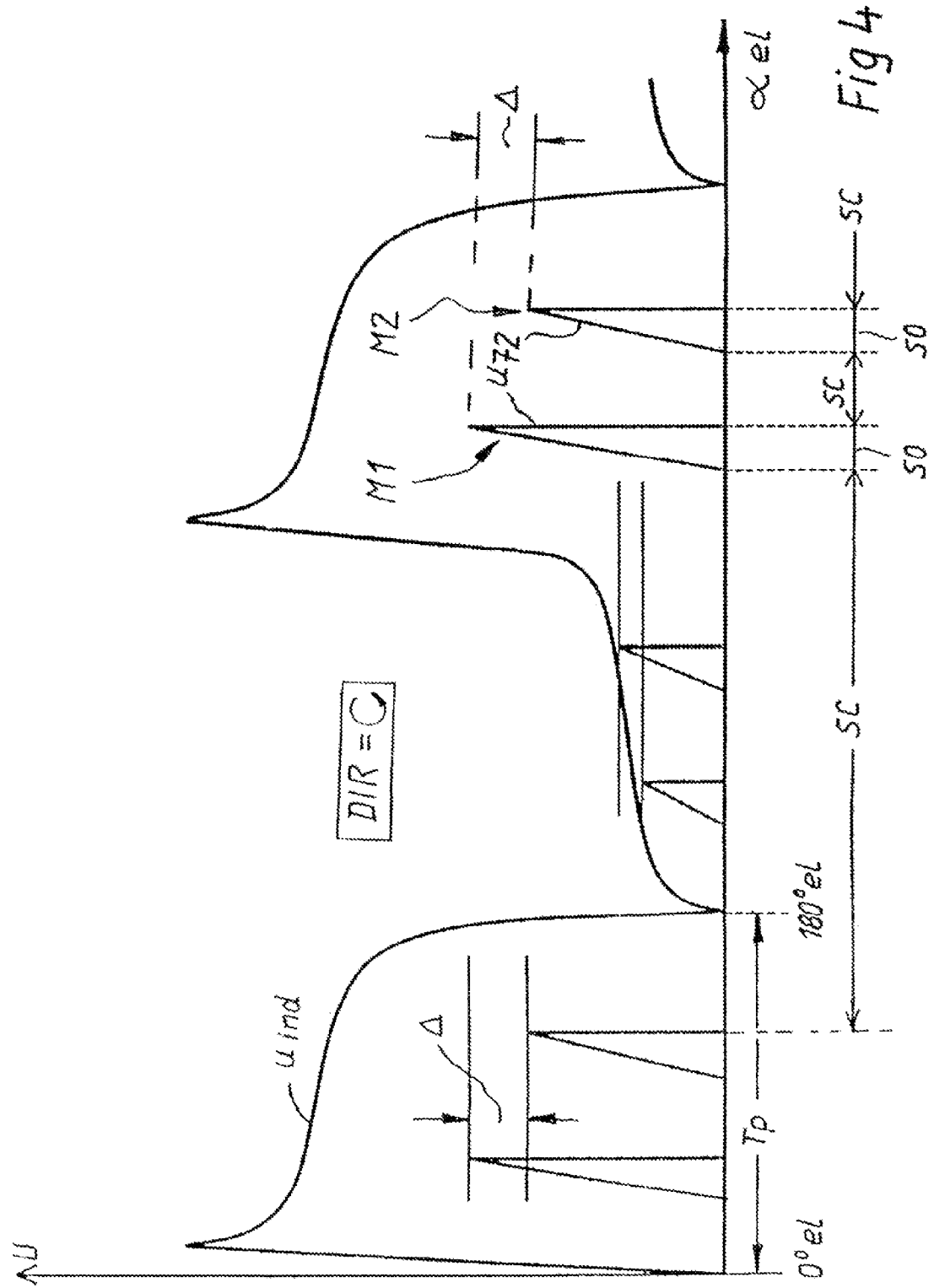
FIG. 4 is a diagram similar to FIG. 3 for the opposite rotation direction.

In FIG. 3, the difference Δ is found to have a negative sign, and in FIG. 4 the sign is positive, since in the case of the rotation direction according to FIG. 4, the voltage U has a decreasing characteristic, whereas in FIG. 3, it has a rising characteristic. This is a property of these two-pulse motors that is exploited in the present case, in order to sense the rotation direction.

It is very advantageous in this context that the current in resistor 46 is kept constant by control transistor 44, i.e. phase 26 that is presently conducting current has substantially no influence on the voltage $u_{ind}$ in phase 24, in which the measurements are taking place, since the constant current in phase 26 causes no transformer coupling to phase 24.

Practical experience has shown that with the method according to FIGS. 2 through 4, reliable results for determination of the rotation direction can be achieved only when the voltage $U_B$ is largely constant, i.e. contains no noise voltages n or N. This prerequisite is often not met in the real world, however, for example in a motor vehicle, and it has therefore proven very advantageous in the context of the invention to perform a noise voltage compensation.

This is done by the fact that, in FIG. 1, the voltage $u_{116}$ at capacitor 116 is additionally measured and is additionally taken into account when determining the rotation direction. The voltage $u_{116}$ is delivered to input 10 of µC 30, and that input 10, like input 8 depicted in FIG. 2, contains a switch S controllable by the program and an A/D converter, so that the voltage $u_{116}$ can also be digitized and temporarily stored.

To allow better monitoring of individual parameters of a DC motor in a noisy environment, the measured variable and noise N must be sensed simultaneously. This requires two identical measurement devices that can record the measured variable and the noise synchronously and in the same format. In motor control systems for inexpensive motors, where only one µC is provided, a simultaneous measurement of this kind is ruled out for technical reasons.

According to the present invention, therefore, the simultaneous measurement that is per se required is replaced by a quasi-simultaneous measurement. A clean signal measurement is then governed by the following basic formula:

$$\text{Signal} = (\text{signal} + \text{noise } N) - \text{noise } N \quad (4).$$

For this purpose, both components must be measured independently of one another and with a time offset.

Figure 5:
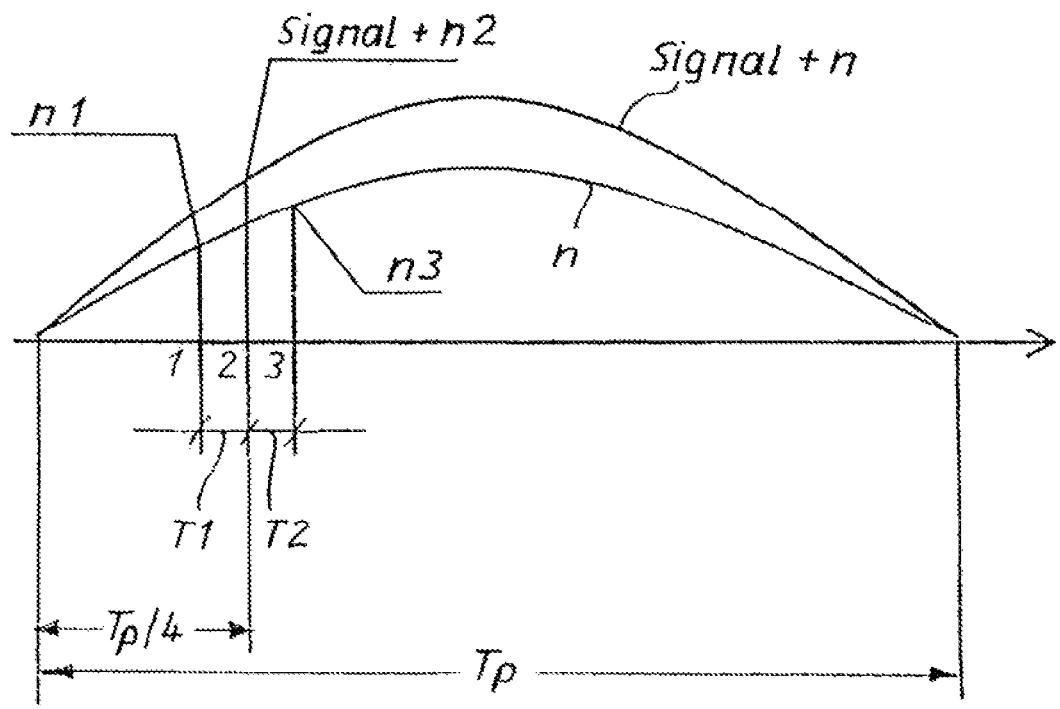
FIG. 5 is a diagram to explain the influence of noise voltages.

FIG. 5 illustrates this using an example. Here the noise component n is measured at a predetermined interval T1 prior to the so-called mixed measurement and also at a time interval T2 after that mixed measurement; the average of the two measured noise components is calculated, and is subtracted from the mixed signal. Quasi-simultaneous monitoring of this kind functions reliably when the frequency
of the noise component is substantially less than 1/T1. The shorter the time interval T1, the higher the noise frequencies that can be compensated for using this quasi-simultaneous measurement method.

FIG. 5 shows a noise component n as the lower curve, and a so-called mixed component, i.e. the signal to be measured plus the noise component n, as the upper curve.

At a time 1, the noise component N1 at that point is measured. At a time 2 the mixed signal is measured, i.e. signal plus N2, and at a time 3 the noise component N3 is measured. As is readily apparent, the noise component can then be calculated out using the formula indicated in FIG. 5, yielding a substantially improved signal, and thus also more reliable detection of the rotation direction.

To cite an example: with an operating voltage of 13 V, a time interval T1=T2 of 32 microseconds, and a noise voltage N of 6 V peak-to-peak, it was possible to compensate effectively for noise frequencies of 0 to 1000 Hz. This allows very reliable detection of the rotation direction, even in an extremely noisy environment.

Figure 6:
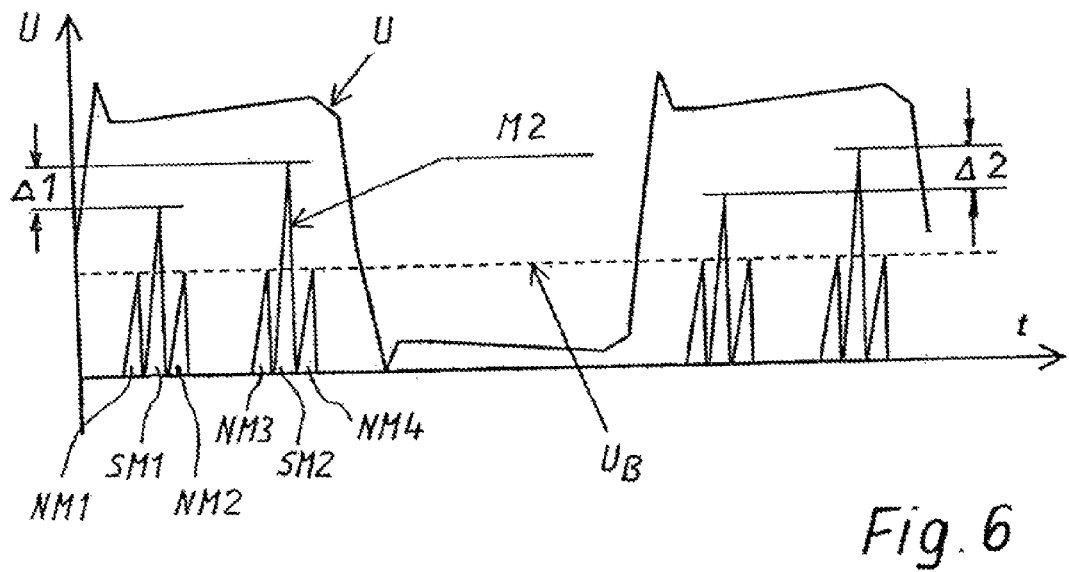
FIG. 6 is a diagram to explain conditions in the situation in which no noise signals are superimposed on the operating voltage $U_B$.

FIG. 6 shows the situation in which the operating voltage $U_B$ contains no noise voltage N. In this case all four noise voltage measurements NM1, NM2, NM3, and NM4 yield the same value, i.e. the calculation produces a value of zero for the noise voltage, and the differences $\Delta 1$, $\Delta 2$ are determined directly from the signal measurements SM1, SM2, etc.

Figure 7:
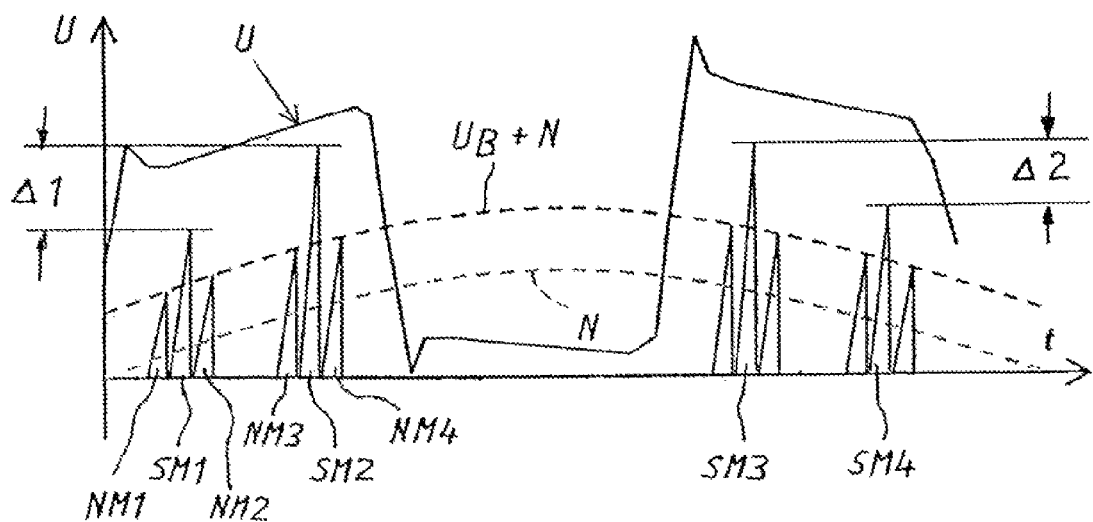
FIG. 7 is a diagram similar to FIG. 6, but showing a noise signal N superimposed on the operating voltage $U_B$.

FIG. 7 shows a situation with a noise voltage N that is superimposed on the operating voltage $U_B$, so that instead of the operating voltage $U_B$ a voltage ($U_B$+N) is obtained.

In this case, voltage U traces a rising profile in the left-hand portion and a falling profile in the right-hand portion; in other words, without correction, the measurements would indicate two different rotation directions, since on the left (SM2-SM1) yields a positive $\Delta 1$, while on the right (SM4-SM3) yields a negative $\Delta 2$, even though the rotation direction of the motor is the same in both cases. In this case, the result of the correction is to produce the same result for the rotation direction in both cases.

Figure 8:
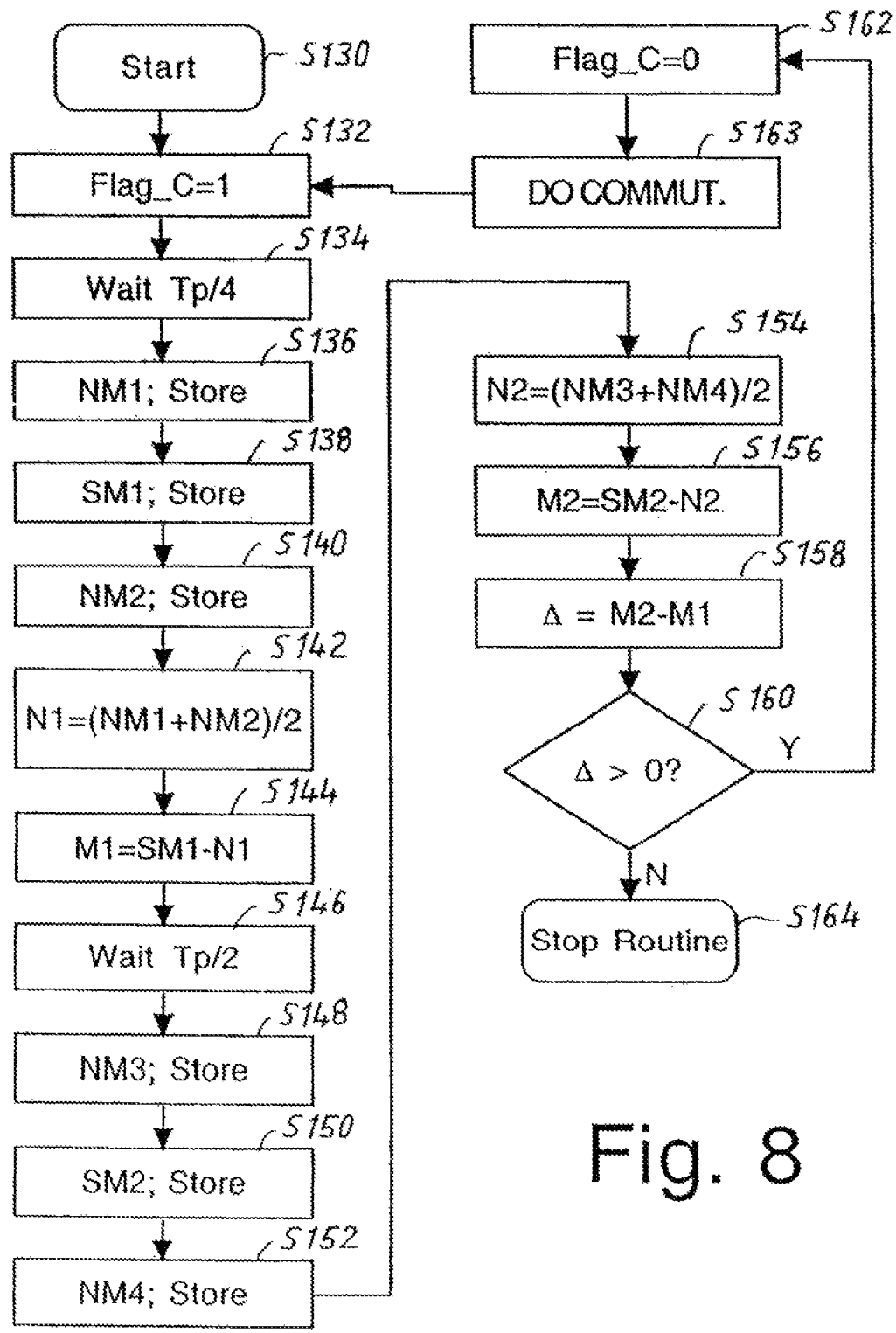
FIG. 8 is a flow chart of a routine according to the present invention for eliminating noise signals in order to make sensing of the rotation direction more reliable.

FIG. 8 shows the routine for correcting the measurements.

The routine begins at S130, where the rotation direction DIR is set to the desired value $DIR_{target}$, i.e. for example to clockwise rotation, and this value is stored. At S132 a Flag C is set to 1, thereby blocking commutation. At S134, a wait time is implemented. The length of the time period Tp between two commutations is known from a previous measurement, and S134 causes execution to wait for a period of approximately Tp/4 since the last commutation.

At S136, the first noise voltage measurement NM1, shown in FIG. 7, is then performed, and the result is stored. At S138, the first signal measurement SM1 is performed (see FIG. 7), and the result is again stored. At S140, the second noise voltage measurement NM2 is performed, and once again the result is stored.

At S142, the averaged noise voltage signal 1 is calculated, i.e.

$$N1=(NM1+NM2)/2 \quad (5).$$

At S144, the corrected measured signal M1 is calculated, i.e.

$$M1=SM1-N1 \quad (6).$$

At S146, execution then waits until, for example, approximately 50% of Tp has elapsed since the last commutation.

Measurement NM3 shown in FIG. 7 is then performed at S148, then measurement SM2 at S150, and measurement NM4 at S152.

At S154, entirely analogously to S142, the averaged value for the noise voltage N2 is calculated, i.e.:

$$N2=(NM3+NM4)/2 \quad (7),$$

and then at S156 the corrected value for the second measurement is calculated as $$M2=SM2-N2 \quad (8).$$

Two corrected measured values M1 and M2 are now in hand, and from them the value $$\Delta=M2-M1 \quad (9)$$

is then calculated at S158. The value of $\Delta$ is positive for clockwise rotation and negative for counterclockwise rotation, and S160 therefore checks whether the actual rotation direction $DIR_{actual}$ corresponds to the predetermined rotation direction $DIR_{target}$. If YES, then in S163 the Flag C from S132 is switched to "0", i.e. to "commutation permitted."

At S163, execution waits for the next commutation, which is performed.

If motor 20 is rotating in the wrong direction, however, i.e. if the reply in S160 is NO, execution then switches over at S164 to a stop routine, motor 20 is braked, and another startup in the desired direction $DIR_{target}$ is attempted.

Figure 9:
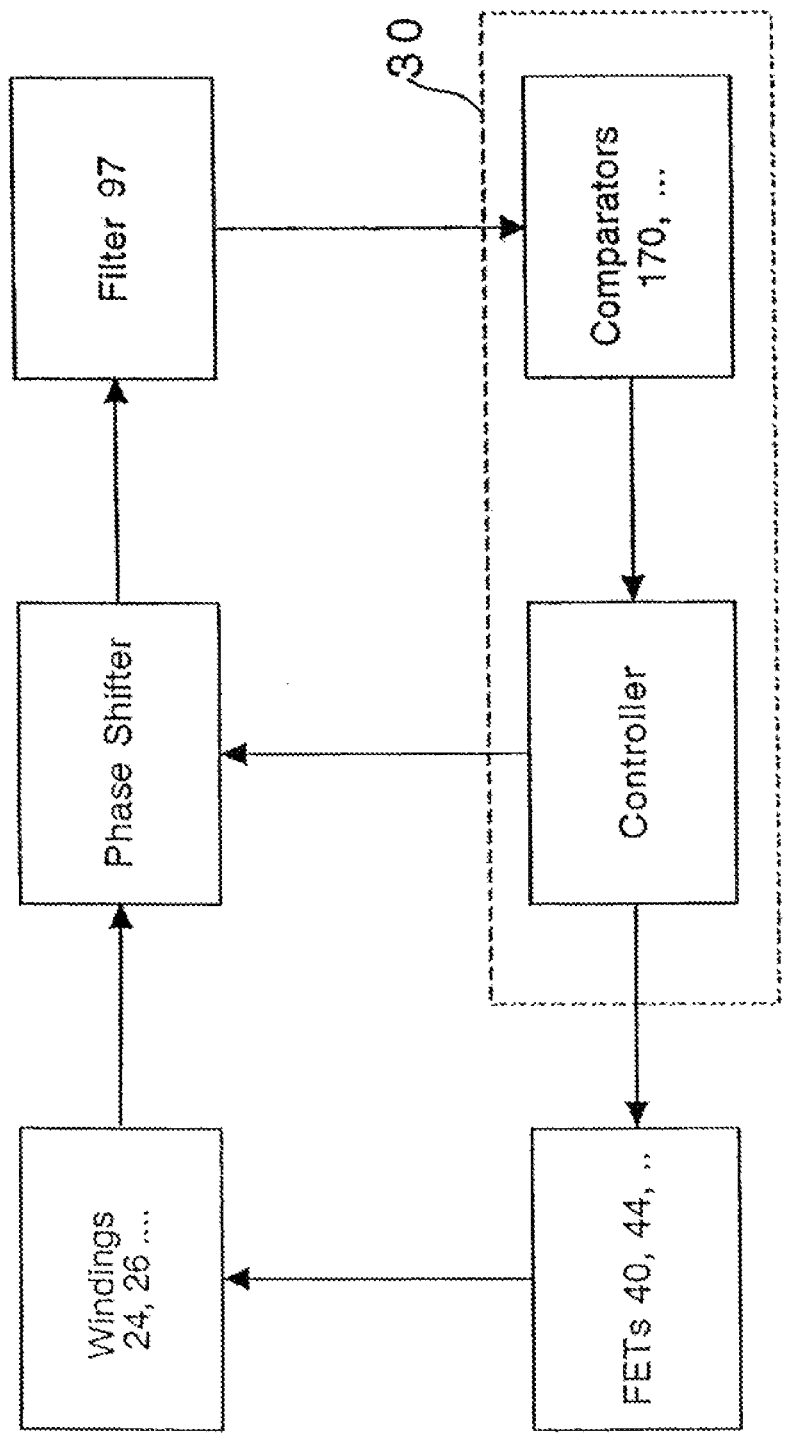
FIG. 9 is a block diagram to explain the so-called "ignition advance" function.

FIG. 9 schematically shows the control system for FETs 40, 44 of motor 20. Among the functions of this control system is to shift the current in phases 24, 26 of motor 20 toward either an earlier or a later point in time when the rotation speed changes. This procedure can occur as a function of motor rotation speed, and the process is today often referred to as "ignition advance."

According to FIG. 9, the voltages in phases 24, 26 are delivered to a phase shifter 90, 94, 100, 104. This phase shifter is a differentiating member, and its output signal is filtered in a filter 96, 98, 106, 108 in order to filter out high-frequency noise. These signals are then delivered to μC 30, which functions simultaneously as a comparator 170 and a control system 172. The output signals of μC 30 control FETs 40, 44 and, by means of them, the currents in phases 24, 26 of motor 20.

Figure 10:
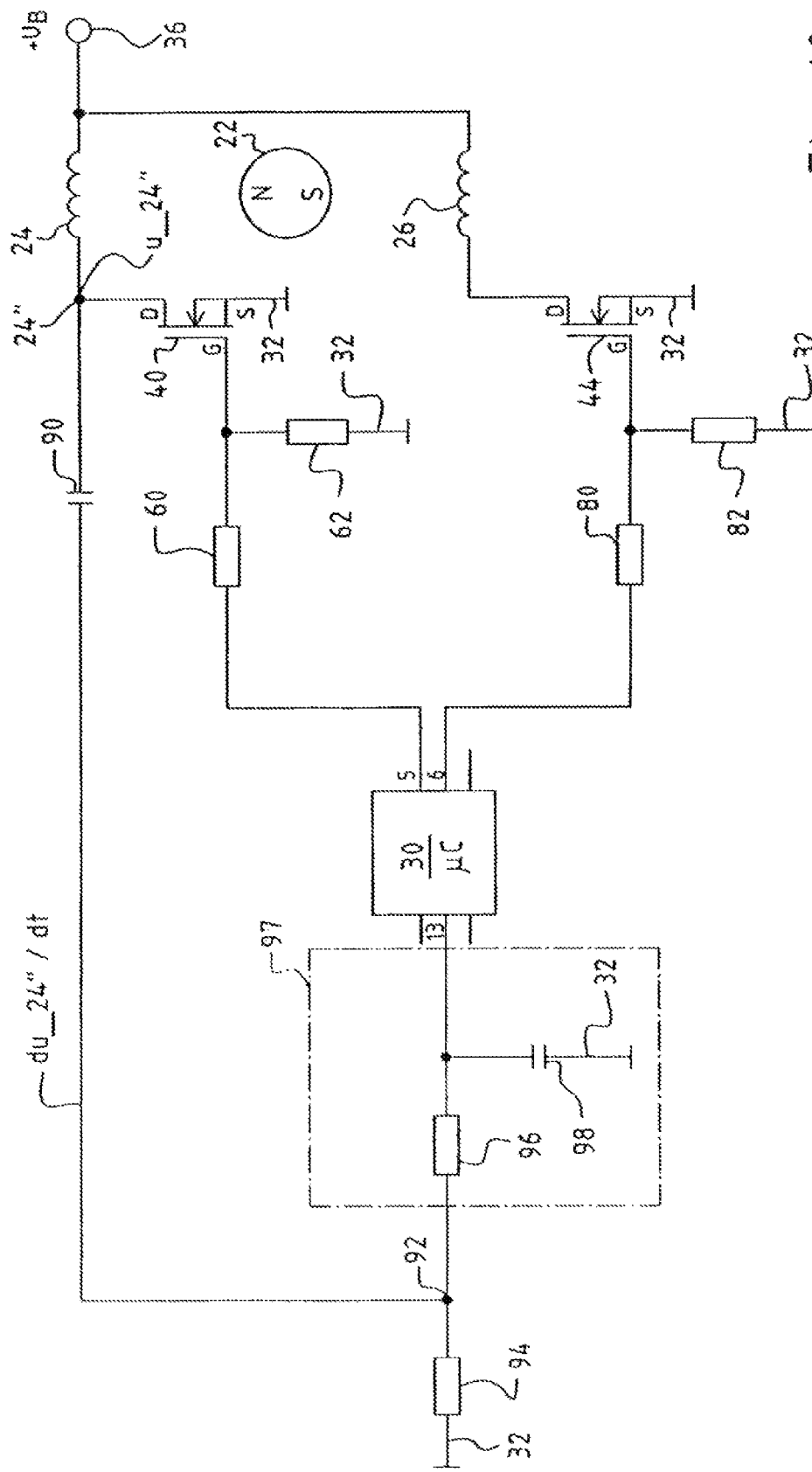
FIG. 10 is a portion of FIG. 1 to explain the ignition advance function, only one differentiating member being shown.

FIG. 10 shows a simplified portion of FIG. 1, not depicting transistor 44 for maintaining a constant motor current.

Figure 11:
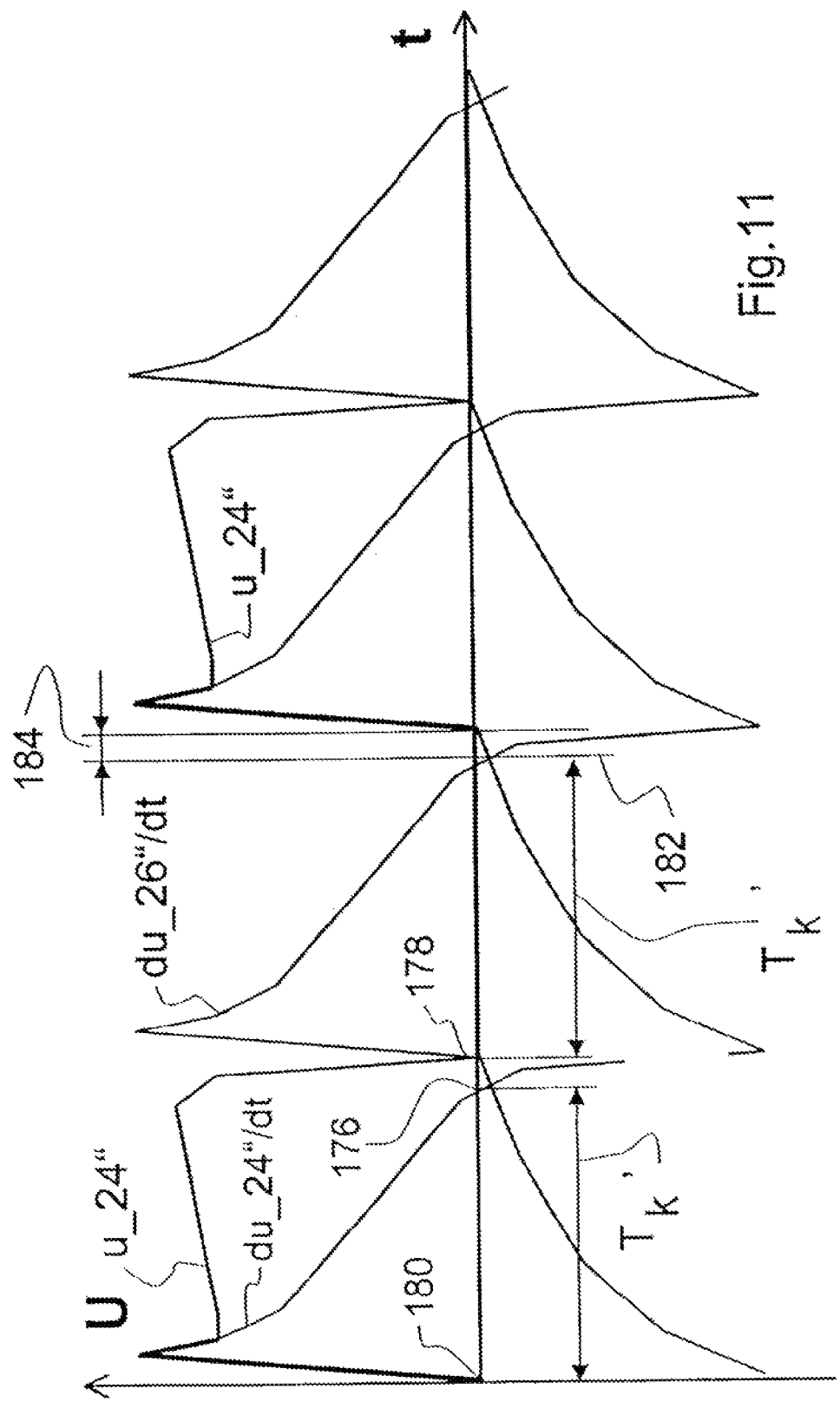
FIG. 11 is a diagram showing voltage profiles, to explain FIGS. 10, 12, and 13.

The potential u_24" at second winding terminal 24" is delivered to the differentiating member, which is made up of capacitor 90 and resistor 94. A differentiated voltage du_24"/dt is obtained at connecting point 92 between these two elements, and this voltage is adjusted, by suitable selection of the components, so that its zero transition 176 is located earlier in time than the zero transition of the induced voltage u_24" (FIG. 11). This zero transition 176 is evaluated in μC 30, and causes a commutation of the currents in phases 24, 26. Simultaneously, the time between beginning 180 of the induced voltage u_24" and zero transition 176 is also measured and, as the time Tk', controls the next commutation.

In FIG. 10 resistor 96 (e.g. 100 K) and capacitor 98 (e.g. 1 nF) serve as a filter 97 at input 12 of μC 30, and prevent high-frequency noise from causing an incorrect measurement.

Figure 12:
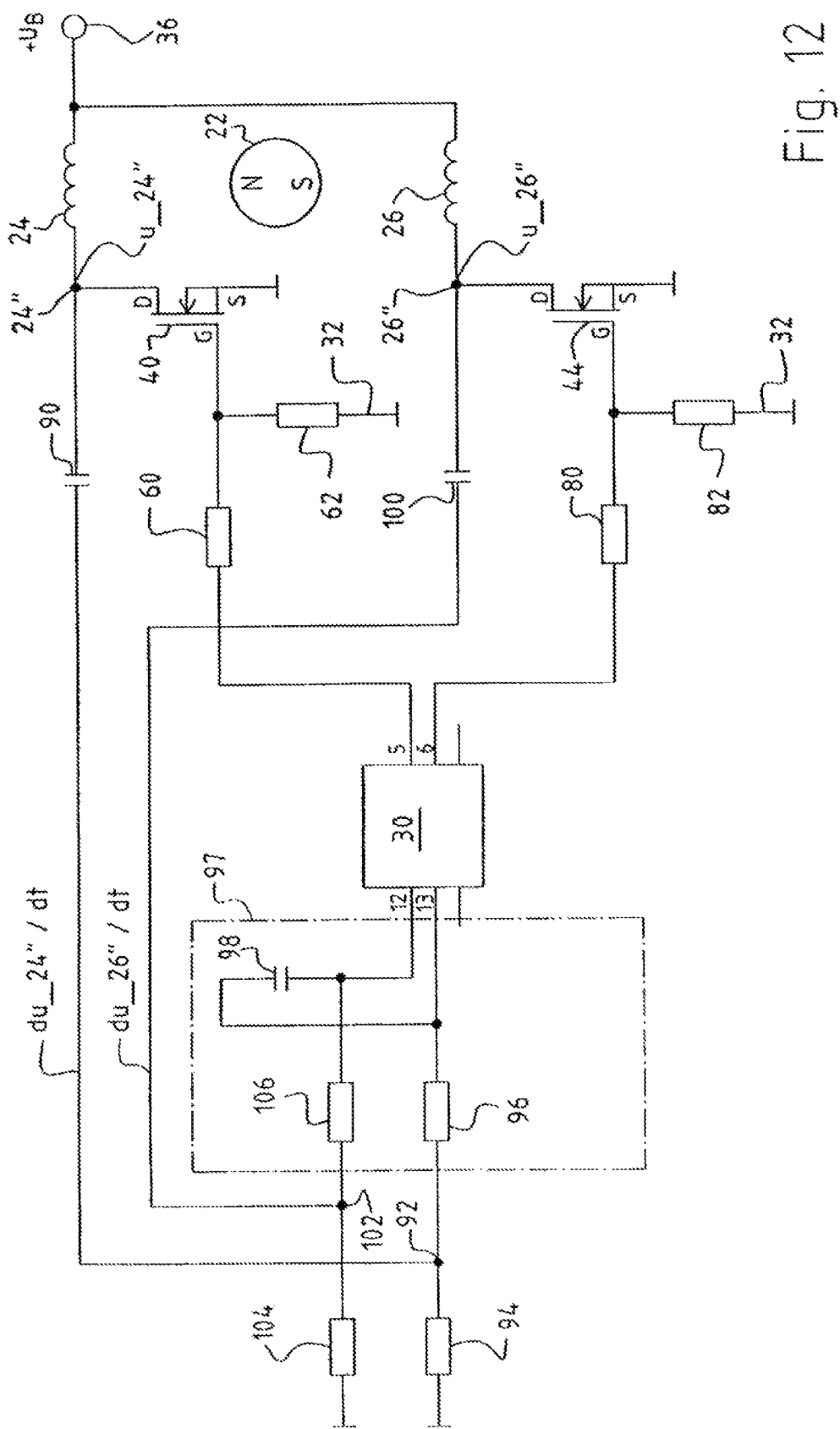
FIG. 12 is a circuit diagram similar to FIG. 10 but with two differentiating members.

FIG. 12 shows a simplified circuit analogous to FIG. 1. Here the potential u_26" at second terminal 26" of phase 26 is additionally subjected to differentiation. This yields a second curve du_26"/dt, i.e. the differential of the potential at terminal 26", in FIG. 11, and in this case this voltage is delivered to input 12 of the μC, while the differential of the potential u_24" is delivered to input 13.

In this instance, μC 30 can sense when the two differentials are of equal magnitude. This is the case, for example, at point 182 in FIG. 11, and point 182 is therefore located at a time interval 184 before the zero transition of the potential u_24".

Figure 13:
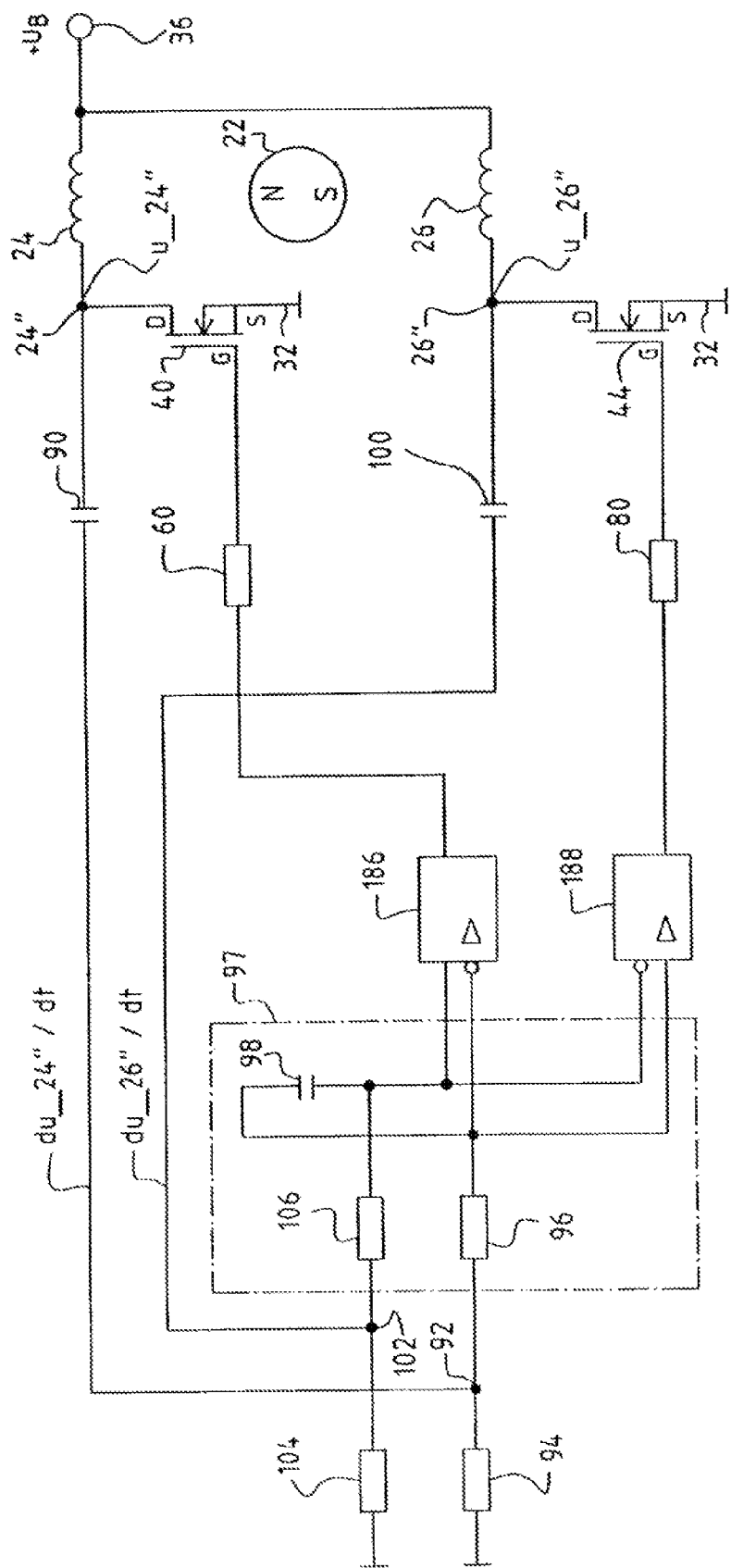
FIG. 13 is a circuit diagram similar to FIG. 12, but in which evaluation of the differentiated signals is accomplished by means of two comparators.

FIG. 13 shows a circuit analogous to FIG. 12, but in which two comparators 186, 188 are used to control commutation. Comparator 186 controls transistor 40, and comparator 188 controls transistor 44. Comparator 186 receives at its positive input the differential of the potential at point 26", and at its negative input the differential of the potential u_24" at point 24". The reverse is the case for comparator 188. The manner of operation is the same as described with reference to FIG. 12, i.e. commutation occurs at the point labeled 182 in FIG. 11, at which the differentiated signal du_24"/dt becomes more positive than the differentiated potential du_26"/dt (and vice versa). This is also a convenient way to achieve ignition advance, and the commutation signals are generated very reliably.

Figure 18:
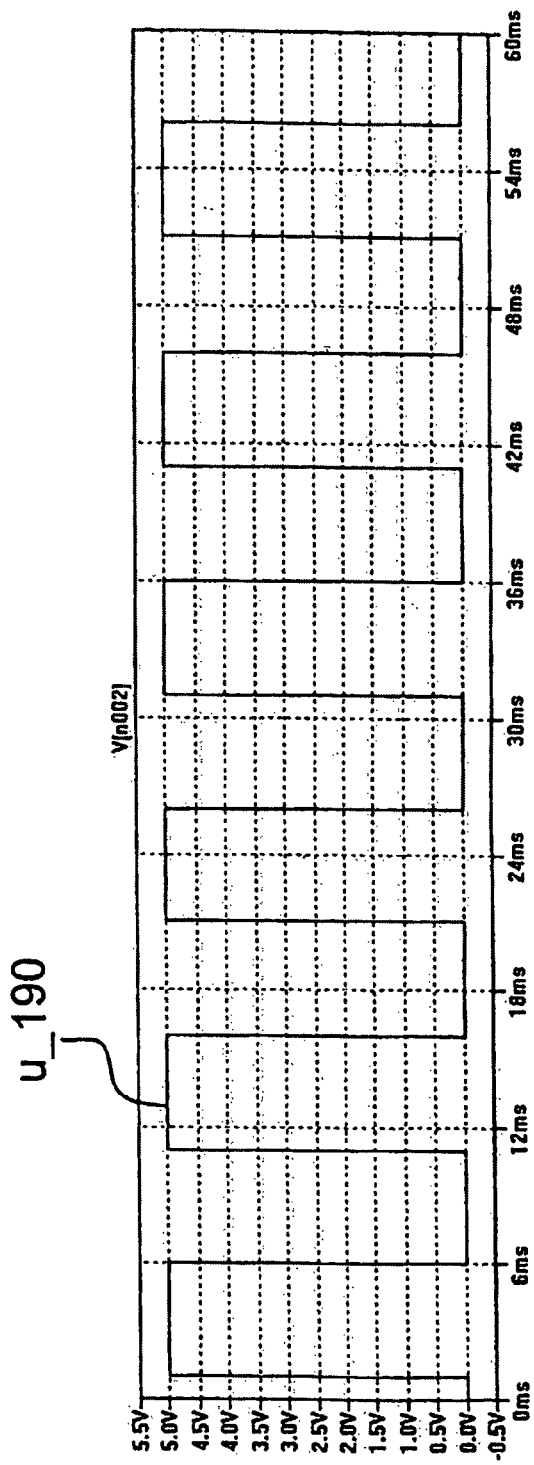
FIG. 18A, FIG. 18B and FIG. 18C depict the signals at the outputs of comparators 190, 188, and 186, respectively, which serve to control the currents in the three phases of the motor of FIG. 15.

The great advantage of this type of commutation using the differentials of the induced voltages u_24", u_26" is that these differentiated voltages, i.e. for example du_24"/dt, have approximately a sawtooth voltage profile, so that very precisely defined intersection points (such as 182 in FIG. 11) are obtained. The output signals of comparators 186, 188, as depicted, for example, in FIG. 18 for a three-phase motor 20', are square-wave signals u_186 and u_188, respectively, which have the same shape as the Hall signals in a motor that uses Hall ICs, and which can therefore be used in known circuits for Hall sensors. If, as in FIG. 14, a μC 30 is additionally used, it can also be utilized to further refine these square-wave signals, i.e. to apply a sort of "signal touchup," as is known to one skilled in the art.

The differentiated voltages as depicted in FIG. 11 for the circuits according to FIG. 12 and FIG. 13 also have relatively small voltage ranges, and can therefore easily be evaluated in comparators 186, 188 of known design.

FIG. 14 shows a circuit for a three-phase motor 20'. This circuit has largely the same construction as the circuit shown in FIG. 13, but the output signals of comparators 186, 188, 190 that are used are delivered to a μC 30 (here a PIC12F675) that converts these output signals into signals for driving motor 20'. Parts identical, or functionally identical, to parts in the previous Figures are given the same reference characters as therein, and such parts usually are not described again.

Motor 20' here has three phases 24, 26, 28, the one terminal 24', 26', 28' of which is connected to positive line 36 (+U_B) Rotor 22 is depicted as having two poles, but can also have different numbers of poles, i.e. four, six, or eight poles.

The current in phase 24 is controlled by an n-channel MOSFET 40 whose drain D is connected via a node 24" to first phase 24, and whose source S is connected to ground 32.

Drain D of FET (Field Effect Transistor) 42 is analogously connected via node 26" to second phase 26.

Drain D of a third FET 43 is analogously connected via a node 28" to a third phase 28.

The voltage u_24" at node 24" is differentiated via a differentiating member (capacitor 90 and resistor 94, connected via node 92) to yield a voltage du_24"/dt. The latter is filtered through a filter element (resistor 96, capacitor 98) and delivered to the negative input of comparator 186 and to the positive input of comparator 190.

Similarly, the voltage u_26" at node 26" is differentiated via a differentiating member (capacitor 100 and resistor 104, connected via node 102) to yield a voltage du_26"/dt. The latter is filtered through a filter element (resistor 106, capacitor 108) and delivered to the positive input of comparator 186 and to the negative input of comparator 188.

Similarly, the voltage u_28" at node 28" is differentiated via a differentiating member (capacitor 110 and resistor 124, connected via node 122) to yield a voltage du_28"/dt. The latter is filtered through a filter element (resistor 126, capacitor 128) and delivered to the positive input of comparator 188 and to the negative input of comparator 190.

The output signal of comparator 186 is delivered to input 2 of μC 30', the output signal of comparator 188 to input 3, and the output signal of comparator 190 to input 4.

Output 7 of μC 30' controls gate G of FET 40 via resistor 60, which gate is connected via resistor 62 to ground 32.

Output 6 controls the gate of FET 42 via resistor 84, which gate is connected via resistor 80 to ground 32.

Output 5 controls gate G of FET 43 via a resistor 81, which gate is connected via a resistor 83 to ground 32.

The manner of operation corresponds to that described in detail with reference to FIG. 13, except that the output signals of comparators 186, 188, 190 do not directly control the three FETs 40, 42, and 43, but instead these signals are evaluated in μC 30' and logically combined with one another in order to control these FETs according to the desired criteria.

Figure 15:
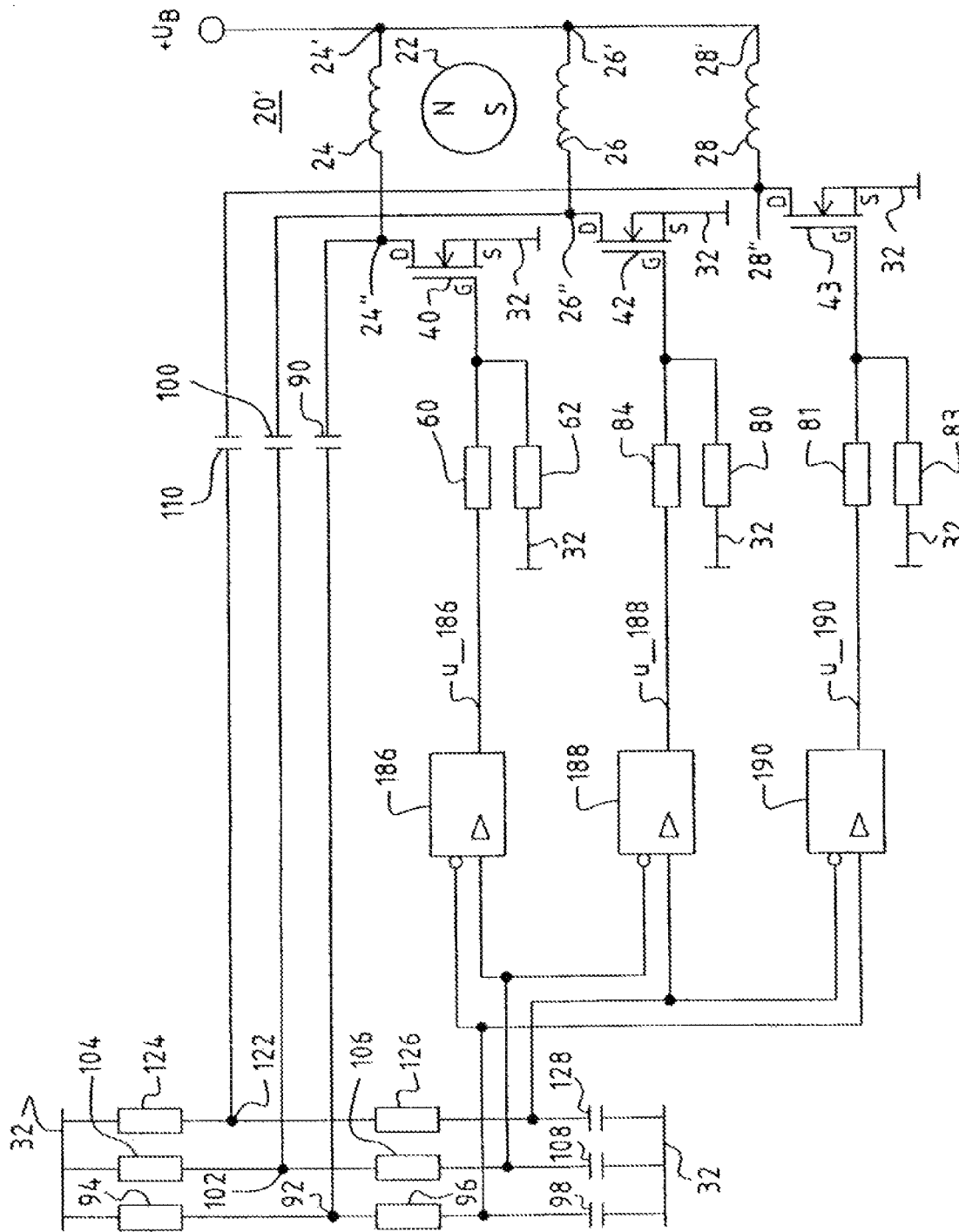
FIG. 15 shows a simplified version of the circuit according to FIG. 14.

FIG. 15 shows a simplified variant of FIG. 14. Parts identical or functionally identical to parts in FIG. 14 are labeled with the same reference characters and therefore are usually not described again.

In FIG. 15, μC 30' of FIG. 14 has been omitted. Resistor 60 is here connected directly to the output of comparator 186, resistor 84 to the output of comparator 188, and resistor 81 to the output of comparator 190. In this case the rotation direction is predefined, whereas in the context of FIG. 14 it can be switched over by way of appropriate logic operations in μC 30'.

Figure 16:
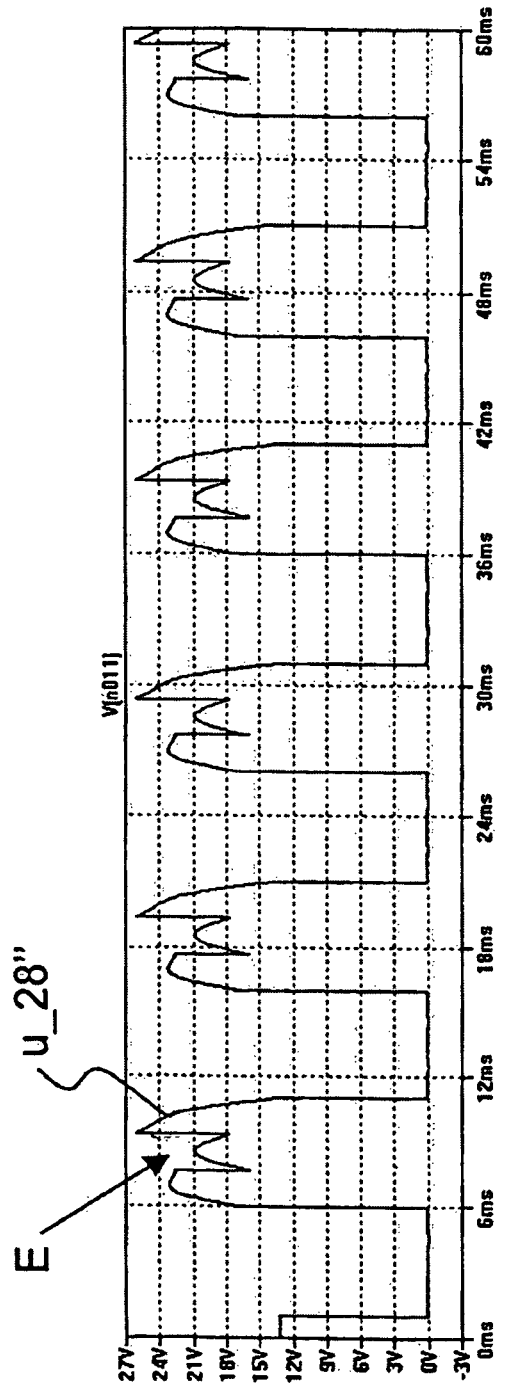
FIG. 16A, FIG. 16B and FIG. 16C depicts the voltages in the three phases of motor 20' of FIG. 15, and are together referred to as FIG. 16.
Figure 16:
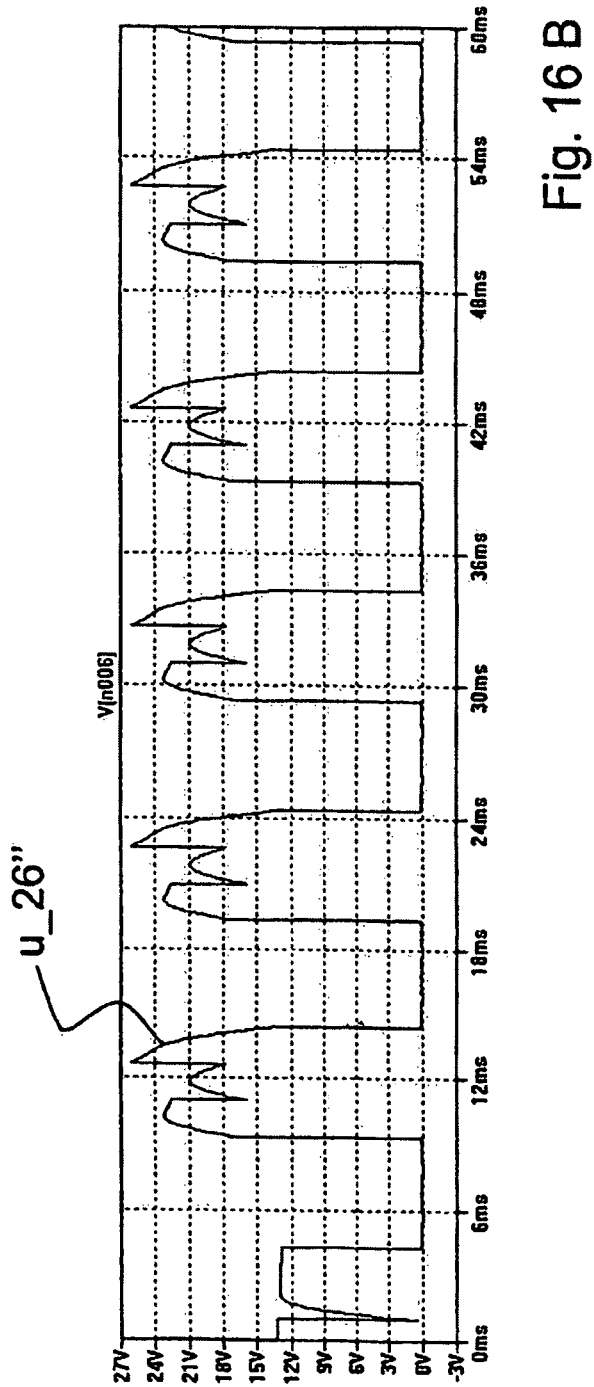
Figure 16:
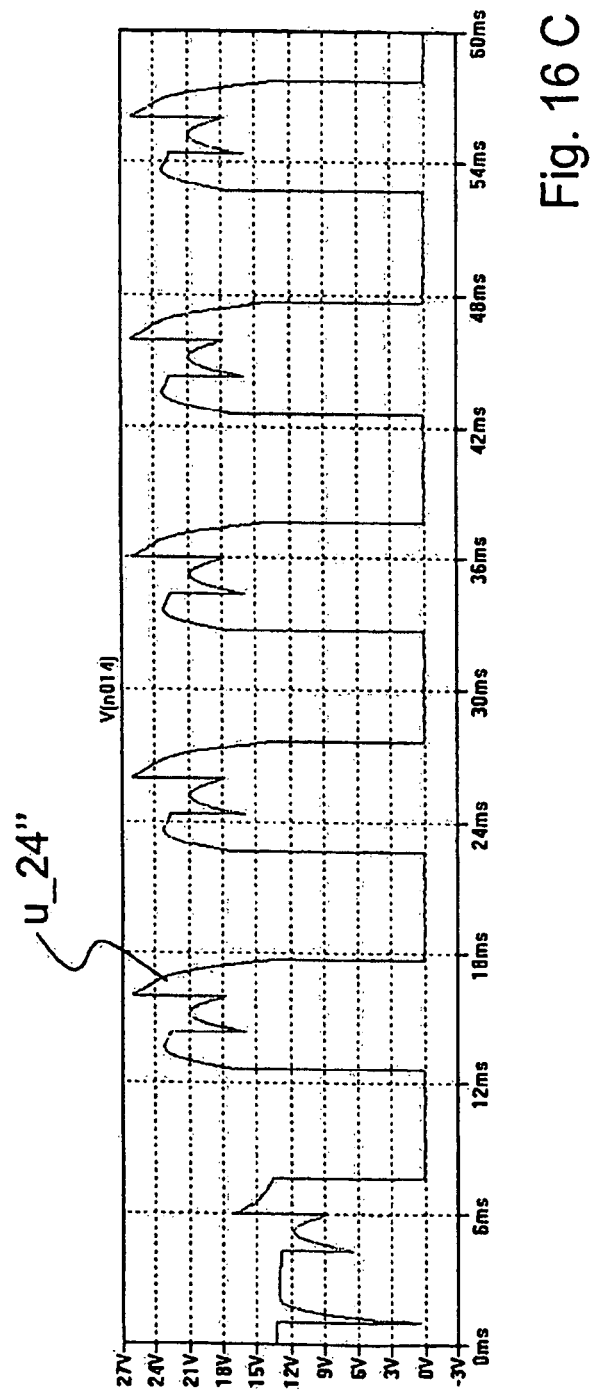

FIG. 16A shows the voltage u_28" at node 28".

FIG. 16B shows the voltage u_26" at node 26".

FIG. 16C shows the voltage u_24" at node 24". These are the voltages in phases 28, 26, and 24. Depressions E are a consequence of the transformer coupling between the coils that was present in the motor being measured.

Figure 17:
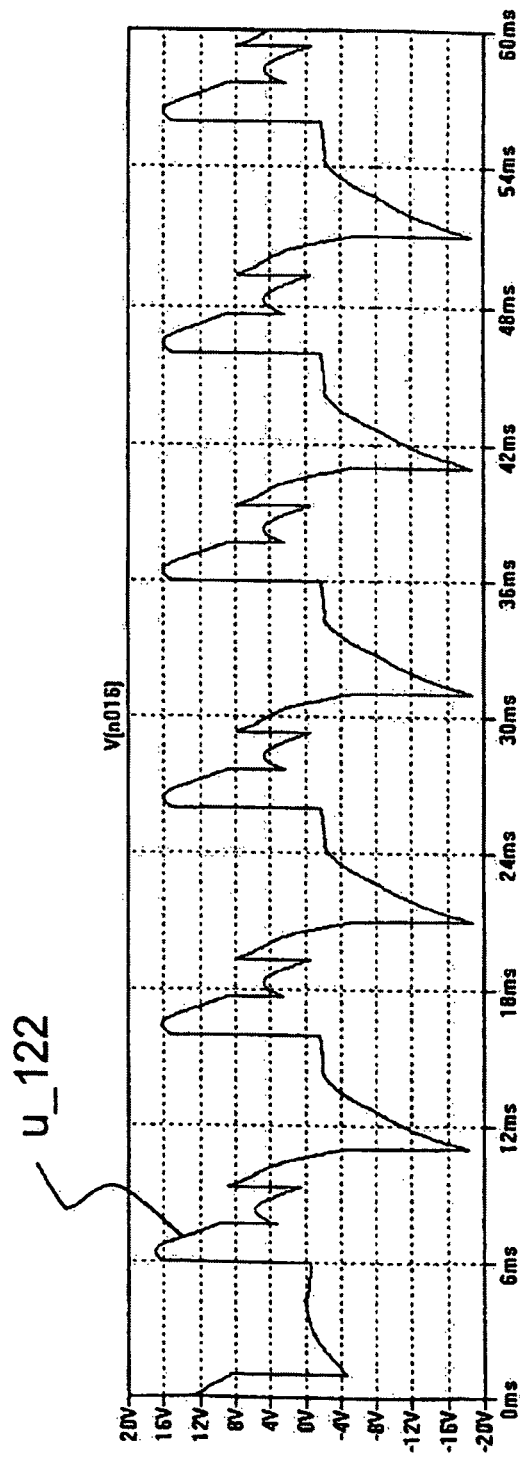
FIG. 17A, FIG. 17B and FIG. 17C depict the voltages of FIG. 16A, FIG. 16B and FIG. 16C after they have been differentiated, and are together referred to as FIG. 17.
Figure 17:
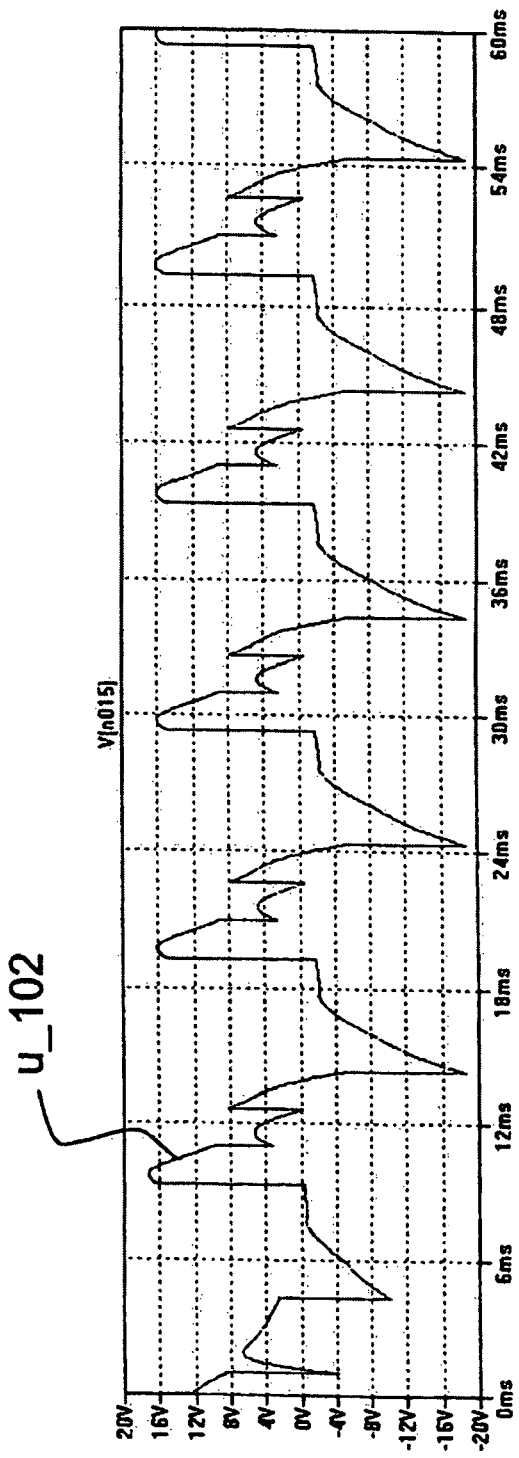
Figure 17:
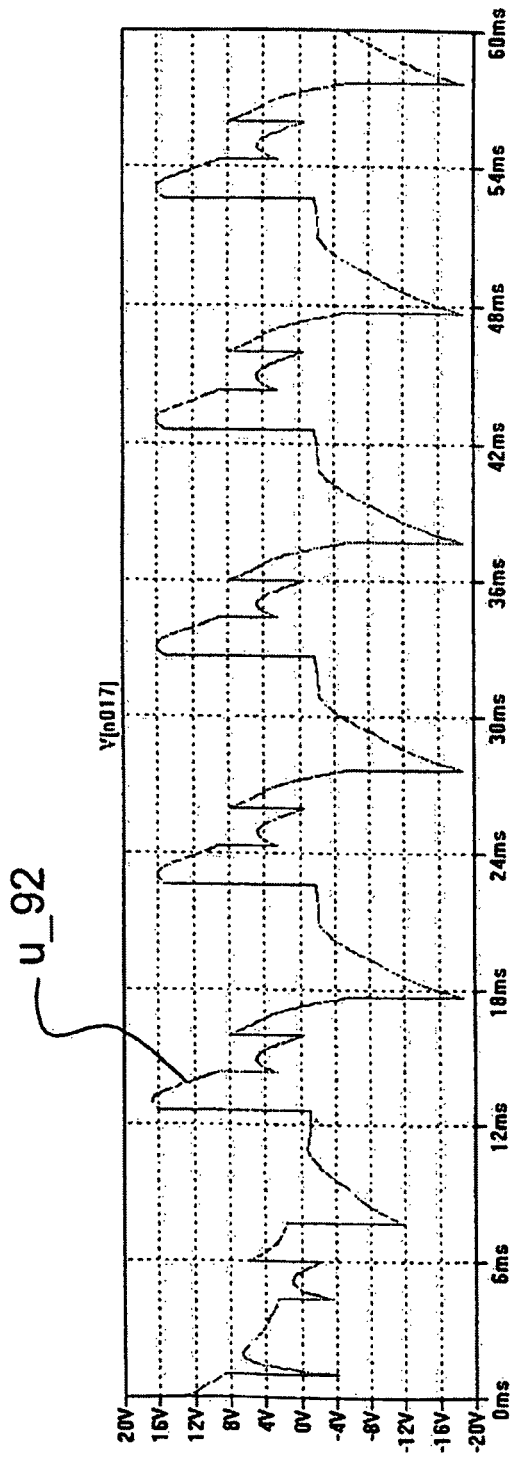

FIG. 17A shows the voltage u_122 at node 122.

FIG. 17B shows the voltage u_102 at node 102.

FIG. 17C shows the voltage u_92 at node 92.

These three voltages represent the differentials of the voltages in coils 28, 26, and 24, respectively.

FIG. 18A shows the signal u_190 at the output of comparator 190.

Figure 18B:
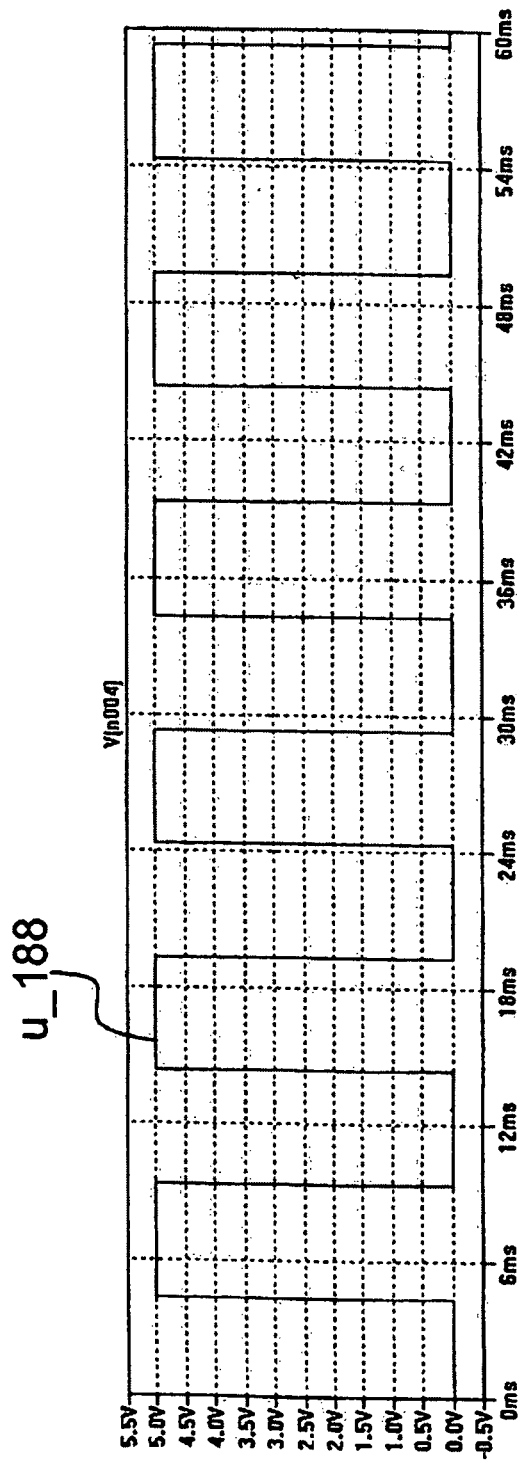

FIG. 18B shows the signal u_188 at the output of comparator 188.

Figure 18C:
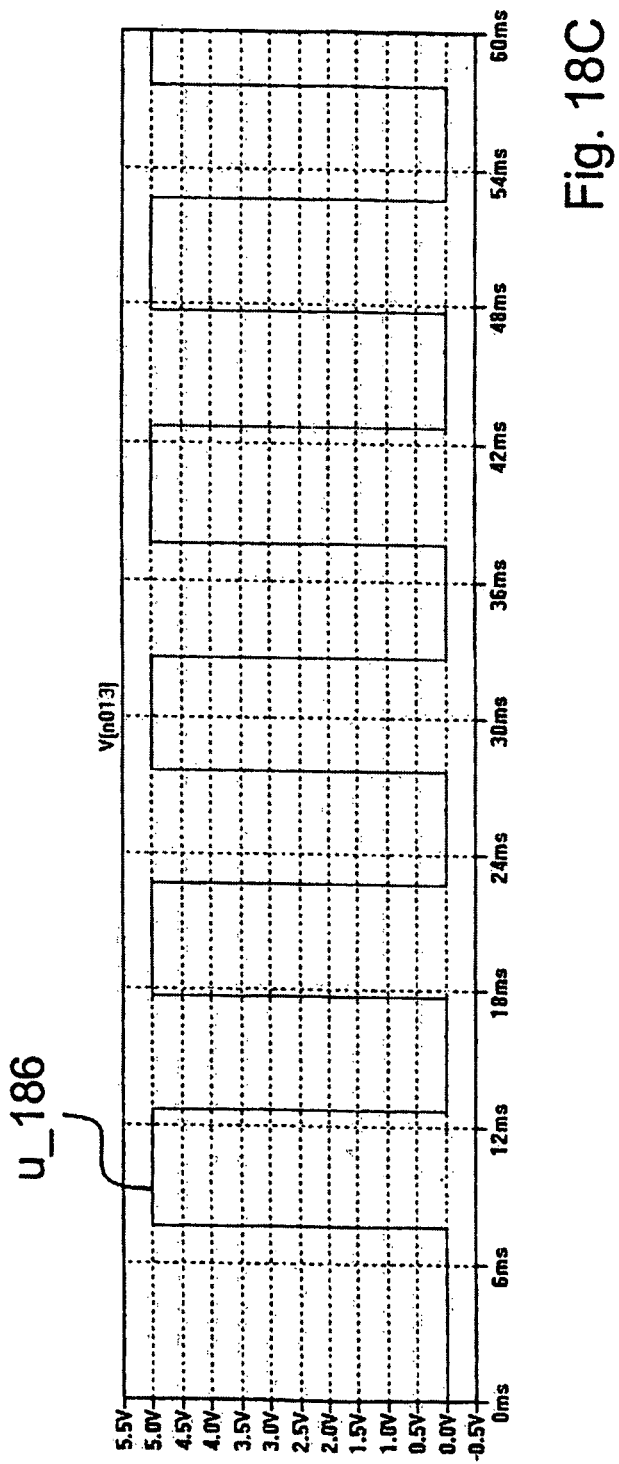

FIG. 18C shows the signal u_186 at the output of comparator 186.

These signals respectively control FETs 43, 42, and 40. It is evident that the signals overlap, since the signals each have a pulse length of 180° el. and an off-time length likewise of 180° el.

With the present invention it is therefore also possible to control a three-phase motor reliably in sensorless fashion.

Sensorless starting of the motor is not depicted in the exemplifying embodiments. All known methods are suitable for this, for example the method according to von der Heide et al. EP 0 536 113 B1 & U.S. Pat. No. 5,280,222, issued 18 Jan. 1994. The algorithm depicted in FIG. 21 of these patents has proven successful in practical use.

Many variants and modifications are of course possible, within the scope of the present invention.

What is claimed is:

1. A method of sensing the direction of rotation in an electronically commutated motor (ECM) having a stator with a plurality of phases (24, 26) and a permanent-magnet rotor (22), which rotor (22), during its rotation, induces voltages in the motor winding phases (24, 26) of the stator, comprising the steps of:

a) commutating the motor at a first time point, and at a second time point subsequent to said first time point, a time interval between said first and second time points defining a commutation period;

b) sampling, at a plurality of characteristic points during said commutation period, either the profile of induced voltage in a presently currentless motor winding phase or the profile of a voltage drop at a transistor through which current is flowing to a presently energized motor winding phase, and storing measured values thereof; and c) deriving, from the measured values, rotor rotation direction;

wherein there exists a predetermined time span (Tp) between two zero transitions of the induced voltage occurring in a currentless phase, or between two zero transitions of the voltage drop at the transistor through which current is flowing to the presently energized phase; and sampling is performed, to store a first measured value, at a time interval after a zero transition that is equal to approximately 20 to 30% of that predetermined time span (Tp).

2. The method according to claim 1, further comprising measuring a second measured value, upon elapse of a time interval after a zero transition, said time interval being equal to approximately 40 to 70% of said predetermined time span (Tp).

3. A method of sensing the direction of rotation in an electronically commutated motor (ECM) having a stator with a plurality of phases (24, 26) and a permanent-magnet rotor (22), which rotor (22), during its rotation, induces voltages in the motor winding phases (24, 26) of the stator, comprising the steps of:

commutating the motor at a first time point, and at a second time point subsequent to said first time point, a time interval between said first and second time points defining a commutation period;

sampling, at a plurality of characteristic points during said commutation period, either the profile of induced voltage in a presently currentless motor winding phase or the profile of a voltage drop at a transistor through which current is flowing to a presently energized motor winding phase, and storing measured values thereof;

shortly before and shortly after the sensing of a measured value (SM1; SM2), sensing at least one respective value (NM1, NM2) characterizing the operating voltage ($U_B$);

from those sensed values, deriving a value which characterizes the noise voltages that are superimposed on the operating voltage, and using said derived value to correct a temporally adjacent measured value; and deriving, from the measured values, rotor rotation direction.

4. A method of sensorless control of commutation in an electronically commutated motor, which motor comprises a stator having at least two phases (24, 26, 28) and a permanent-magnet rotor (22), said rotor inducing, during its rotation, a voltage in said at least two phases, each phase having, associated with it, a respective transistor (40, 42, 43) to control current in the phase, and each phase having, associated with it, a respective terminal (24", 26", 28"), each terminal being connected to the phase and to the transistor, comprising the steps of:

a) differentiating over time, for a plurality of phases (24, 26, 28), respective voltage signals tapped at said respective terminals to produce derivatives over time; and b) comparing said derivatives over time with one another to control current flow in an associated phase (24, 26, 28) of the stator.

5. The method according to claim 4, further comprising first filtering said derivatives over time, and then comparing said derivatives over time with each other.

6. The method according to claim 4, further comprising delivering the derivatives over time to comparators (188, 190) and comparing them in the comparators with each other, in order to generate a signal if a first predetermined relationship prevails between two such derivatives, and to switch that signal off again if a second predetermined relationship prevails.

7. A method of sensorless control of commutation in an electronically commutated motor, which motor comprises a stator having at least one winding phase (24, 26) and a permanent-magnet rotor (22), said rotor inducing, during its rotation, a voltage in said at least one winding phase (24, 26), comprising the steps of:

a) differentiating the induced voltage in the at least one phase, or the voltage drop at a transistor through which current is flowing to the presently energized phase, to produce a differentiated signal;

b) using that differentiated signal to control current flow in an associated winding phase (24, 26) of the stator;

c) calculating a derivative over time for the at least one phase, and during a first portion of the rotation of the rotor (22), measuring a time interval (Tk') from a first zero transition (180) of that derivative to a second zero transition (176) thereof; and d) using that measured time interval (Tk') to control commutation during a subsequent second portion of the rotation of the rotor (22).

* * * * *